Sept. 29, 1970   R. L. ANDERSON   3,530,587
IMPRESSION GUN
Filed Sept. 30, 1968
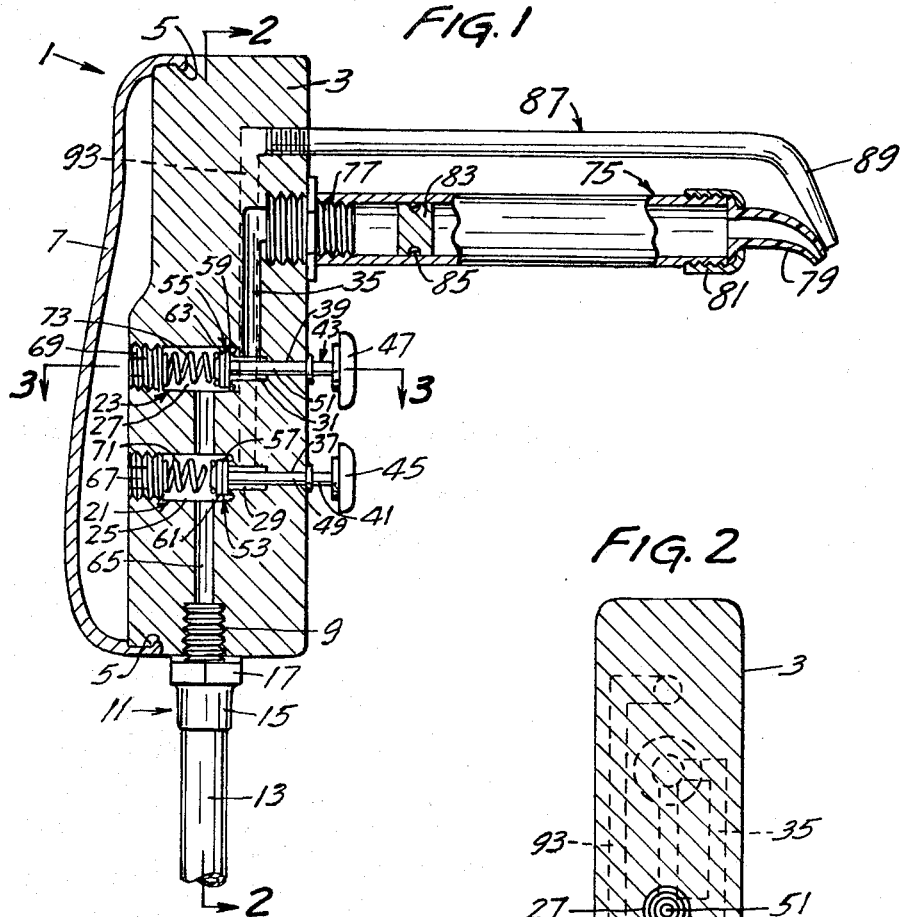
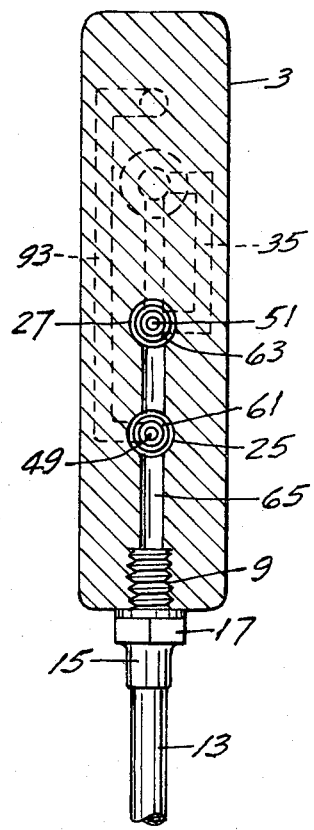
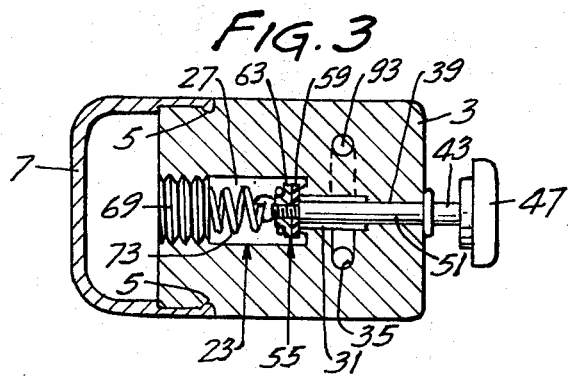
INVENTOR.
ROBERT LEO ANDERSON
BY Walter N. Kim Jr.
ATTORNEY

United States Patent Office 3,530,587
Patented Sept. 29, 1970

3,530,587
IMPRESSION GUN
Robert Leo Anderson, 89 Wildwood Beach Road,
Mahtomedi, Minn. 55115
Filed Sept. 30, 1968, Ser. No. 763,621
Int. Cl. A61c 5/04
U.S. Cl. 32—60    4 Claims

ABSTRACT OF THE DISCLOSURE

A pneumatically operated gun providing for separate application of an air blast and impression material to one or more teeth prepared for the taking of dental impressions, such gun providing a connection to the compressed air line found in dental offices, which compressed air can be internally regulated by means of manually manipulable valves to provide for the discharge of the air and/or impression material to the region of the tooth being cared for.

---

This invention relates to a pneumatic discharge device; more particularly it relates to a pneumatic device for delivering air and impression material in the preparation of impressions for inlays, crowns, bridges, and the like.

At the present time, there are two principal methods employed in making impressions for inlays, crowns and bridges, the first involving the use of copper bands and the second involving a syringe and tray. The former method requires measuring the abutment tooth to select the proper band size, contouring one end of the band to fit the gingival contour of the tooth, fillling the band with one of several types of impression material, placing the impression filled band over the tooth, and then manually pushing the band into place around the tooth and into the gingival area. Once in place, the impression material is permitted to set for a period of time depending upon the impression material selected, and the band carefully removed to avoid distortion. This band technique is disadvantageous from the standpoint of time involved in measuring, trimming, and fitting the band, difficulty in securing the impression material filled band in place on the tooth, and entrapment of impression distorting matter such as air, exudate, saliva, and blood.

In the second method, employing the syringe and tray, the syringe is filled with impression material, the subject tooth washed, dried, and isolated, and a small amount of impression material ejected from the syringe around the tooth and into the gingival area. The tray containing additional impression material is then placed over both the subject or abutment tooth and the adjacent tooth, the impression material permitted to set, and then removed. The primary disadvantages of this conventional syringe and tray method are the difficulty in placing the impression material under the gum tissue with the hand syringe alone, the need for a gingival pack, the difficulty of keeping the preparation dry which is essential to adherence of the impression material to the tooth, and, as with the copper band technique, the difficulty of keeping the preparation free of impression distorting matter during the procedure.

As a result of these shortcomings, the chance of obtaining a defective impression is greatly enhanced. If detected at the time the impression is initially taken, the loss is a matter of valuable time. However, as often occurs, the defect is not detected until after the finished setting is prepared and an attempt made to conform it to the subject tooth making the loss in time, material and labor costs considerably greater.

The disadvantages of the above impression taking techniques are due in large part to the number of manual steps which must be separately undertaken in rapid order so that of necessity there is a time lapse between the time of tooth preparation when the operative area is freed of impression distorting matter and the time the impression material is placed in contact with the tooth. Generally, the cumbersome nature of these techniques requires the presence of an assistant.

The device of the present invention significantly reduces the disadvantages encountered in the above techniques, especially that involving the syringe and tray, by providing for the elimination of impression distorting matter from and the insertion of impression material into the operative area including the gingival tissue at the same time or in rapidly succeeding order so that the opportunity for re-infestation is eliminated. This advantage as well as others which will be apparent hereinafter are provided by an apparatus which comprises a housing, inlet means for introduction of fluid under pressure, first and second outlet means operatively connected to said inlet means, valve means for regulating the flow of said fluid to each of said outlet means, said first outlet means comprising an elongated member adapted for insertion into the oral cavity defining a chamber portion and a terminal portion, said chamber portion being communicable with said terminal portion and adapted for storage of impression material, and means associated with said first outlet means actuatable by said fluid for causing said impression material to discharge from said terminal portion of said first outlet, said second outlet means comprising a hollow elongated member adapted for insertion into the oral cavity to provide a conduit for said fluid.

To promote a better understanding of the invention, reference is made to the attached drawings wherein:

FIG. 1 is a cross-sectional view in elevation of the device of the present invention;

FIG. 2 is a cross-sectional view of FIG. 1 taken along line 2—2; and

FIG. 3 is a cross-sectional view taken along line 3—3 of FIG. 1.

Referring to FIGS. 1–3, numeral 1 designates the impression gun of the present invention having a housing 3 which contains a groove 5 adapted to receive a detachable grip member 7 which is shaped to permit comfortable grasping of the impression gun. The grip member 7 is preferably sufficiently resilient so that it can be snapped into the groove 5 and positively held in place without the need for auxiliary attaching means. The detachable grip member permits ready access to the housing interior which holds the working parts thereby facilitating construction and maintenance. Housing 3 has a threaded female portion at the lower end thereof to receive the hollow threaded male portion 9 of fitting 11 which serves as the connection for the air line 13 commonly present in dental offices. In addition to the threaded portion 9, the fitting 11 includes a collar portion 15 which is pressed onto air line 13 and tightened to housing 3 by means of the integral nut 17.

About midway of the longitudinal axis of the housing 3 are a pair of vertically spaced valve ports 21 and 23 which respectively, comprise valve seat chambers 25 and 27 which communicate with neck portions 29 and 31 which in turn communicate with passages 37 and 39. Valve members 41 and 43 received by valve ports 21 and 23, respectively, comprise, respectively valve buttons 45 and 47 located exterior of housing 3, valve stems 49 and 51, extending through neck portions 29 and 31, and valve seat members 53 and 55 which include gaskets 57 and 59 and backing plates 61 and 63. Communicating with hollow male portion 9 and valve seat chambers 25 and 27 rearward of valve seat members 53 and 55 is air conduit 65.

At each end of valve ports 21 and 23 are set screws 67 and 69, respectively. Between the ends of set screws 67 and 69 and backing plates 61 and 63 are disposed a pair of springs 71 and 73, respectively, whose longitudinal axes extend along the line of the longitudinal axis of valve ports 21 and 23.

Vertically spaced from valve port 23 near the top of housing 3 is a barrel 75 providing a first outlet means threadedly attached to housing 3 by hollow threaded adapter 77. At the terminal end of barrel 75 is downwardly curving nozzle member 79 attached to barrel 75 by means of threaded collar 81. Within barrel 75 is a piston 83 movable along the interior walls thereof by means of air pressure emanating from air line 13. To insure a proper air seal piston 83 is circumferentially fitted with an O-ring 85. The interior portion of barrel 75 between piston 83 and nozzle 79 defines a chamber from the storage of impression material, of either high or low viscosity, not shown. Air line 35 provides an air passage from neck portion 31 of valve port 23 to the fitting 11 and thus to piston 83 for actuation thereof when valve button 47 is depressed, as will be discussed more fully hereinafter.

Vertically spaced from barrel 75 is tubular member 87 providing a second outlet means threaded at one end to provide attachment to the housing 3. Tubular member 87 has a downwardly curving constricted terminal portion 87, the tip of which is located slightly above and adjacent to the tip of nozzle member 79. An air passage between neck portion 29 of valve port 21 and tubular member 87 is provided by means of air line 93.

In operation, the barrel 75 is detached from housing 3, filled with a suitable impression material, and re-attached to the impression gun. The gun is then connected to a compressed air source. The prepared tooth can then be blown free of impression distorting matter by an air blast from tubular member 87. The air blast is obtained by finger tip depression of valve button 45 which pushes valve seat member 53 beyond the point in valve seat chamber 25 where air conduit 65 enters thereby creating a closed circuit from air line 13 to tubular member 87 via air line 93. Impression material is then inserted between the subject tooth and the surrounding gingival tissue by depressing valve button 47 which permits compressed air to pass into air line 35 and thence into barrel 75 to actuate piston 85 thereby forcing impression material out of the chamber portion of barrel 75 through nozzle 79.

As an alternative to charging the barrel 75 with one site mixed impression material, pre-mixed impression material stored in a hermetically sealed container preferably of a suitable plastic sheet material could be inserted into the barrel. After charging, the container is punctured by insertion of a suitable shaped pointed instrument through nozzle 79 to permit discharge of the impression material.

The advantages of the impression gun of this invention are manyfold. The air line commonly found in dental offices is under sufficient pressure to cause the impression material to be forcibly inserted below the gum tissue to provide excellent chances for a correct impression. The dual provision of an impression material source and an air source in a device controllable with one hand enables the dentist to simultaneously or in rapidly succeeding order free the subject tooth of impression distorting matter and apply impression material thereby accomplishing savings in time and insurance against an incorrect impression with its consequent loss in both time and money. Because the impression gun is fully manipulable with one hand, the other hand is free for use in directing other instruments such as a probe or a mirror thereby eliminating the need for an assistant. The use of gingival packs is also eliminated with the possible exception of very deep preparations.

Impression materials of various types may be employed in conjunction with the device of this invention including conventional polysulfide rubber base materials and silicone rubber base materials.

It is to be understood that various modifications of the apparatus herein described may be made without departing from the spirit and scope hereof. While the apparatus of this invention has been specifically described with reference to dental operations, it is to be further understood that it is amenable to use in other analogous operations.

Having particularly described my invention, what is claimed is:

1. An apparatus which comprises a housing, inlet means for introduction of fluid under pressure, first and second outlet means operatively connected to said inlet means, selectively operable valve means for regulating the flow of said fluid to each of said outlet means, said first outlet means comprising an elongated member adapted for insertion into the oral cavity defining a chamber portion and a terminal portion, said chamber portion being communicable with said terminal portion and adapted for storage of viscous impression material, and means associated with said first outlet means actuatable by said fluid for causing said impression material to discharge from said terminal portion of said first outlet, said second outlet means comprising a hollow elongated member adapted for insertion into the oral cavity to provide a conduit for said fluid.

2. The apparatus of claim 1 wherein said valve means are actuable by a pair of digitally manipulable, control members located externally of said housing.

3. The apparatus of claim 1 wherein said first and second outlet means have downwardly depending terminal portions the ends of which are each in close, proximal relationship to the other.

4. The apparatus of claim 1 wherein said means associated with said first outlet means is a piston member disposed within said chamber portion of said first outlet means.

References Cited

UNITED STATES PATENTS

| | | | |
|---|---|---|---|
| 2,153,419 | 4/1939 | Hoffman | 222—4 |
| 2,791,354 | 5/1957 | Maritz | 222—389 |
| 3,225,759 | 12/1965 | Drapen et al. | 128—66 |

ROBERT B. REEVES, Primary Examiner

H. S. LANE, Assistant Examiner

U.S. Cl. X.R.

128—235; 222—4, 389